July 26, 1960 R. M. CARRIER, JR 2,946,429
HELICAL CONVEYOR
Filed May 9, 1958
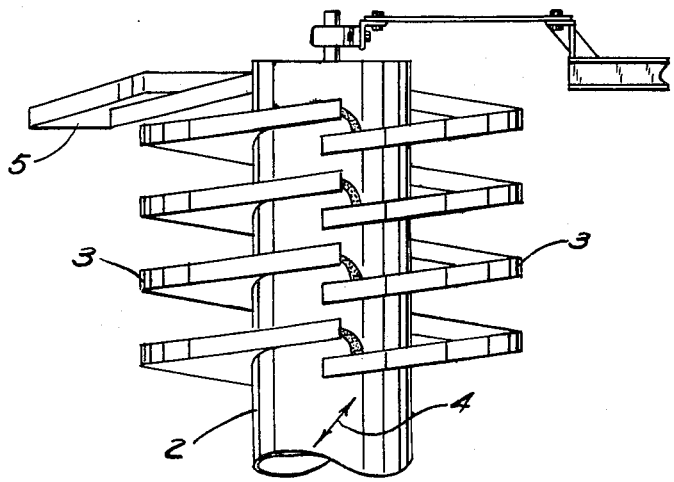
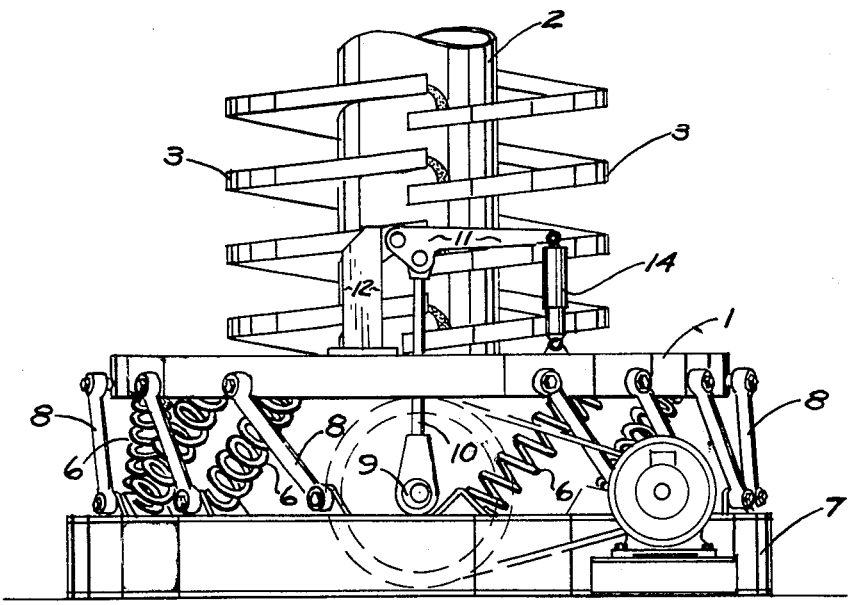
INVENTOR.
ROBERT M. CARRIER JR.
BY
Oberlin & Limbach
ATTORNEYS

:

United States Patent Office 2,946,429
Patented July 26, 1960

2,946,429

HELICAL CONVEYOR

Robert M. Carrier, Jr., Louisville, Ky., assignor, by mesne assignments, to Chain Belt Company, Milwaukee, Wis., a corporation of Wisconsin Filed May 9, 1958, Ser. No. 734,363

2 Claims. (Cl. 198—220)

The present invention relates generally as indicated to a helical conveyor, the present application being a continuation-in-part of my copending application, Serial No. 294,881, filed June 21, 1952, now abandoned.

It is one principal object of the present invention to provide a helical conveyor having a series of vertically offset helical troughs so arranged that when the conveyor is vibrated to toss material supported on said troughs angularly, upwardly and forwardly, the material is conveyed uphill from the bottom end of one helical trough to the top end thereof and is discharged from said top end onto the bottom end of the next helical trough, the material thus being periodically cascaded and turned over to promote mixing and cooling, and retaining fluffiness therein.

It is another object of this invention to provide a helical conveyor which has the compactness of an ordinary helical conveyor with reference to the great length of helical trough in a small space while yet there is the added feature of the periodic cascading of the material downwardly from the top end of one ascending helical trough to the bottom end of the next ascending helical trough.

It is yet another object of this invention to provide a helical conveyor having a series of vertically offset ascending helical troughs which is characterized in that with a prescribed helix angle or lead of the troughs there is a substantial increase in the total length of the helical material supporting surface without increase in either the diameter or the height of the conveyor.

Other objects and advantages will become apparent as the following description proceeds.

To the accomplishment of the foregoing and related ends, the invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

In said annexed drawing the single figure shows a helical conveyor embodying the present improvements.

Referring now in detail to the drawing, the conveyor comprises a base portion 1 to which is mounted a vertical center tube 2 and around which tube are disposed a series of circumferentially overlapping and axially offset ascending helical material supporting and conveying pans 3, each pan as shown terminating above the lower end portion of the next succeeding pan.

As is evident, when the conveyor is vibrated along the path denoted by the line 4, material to be conveyed which is loaded onto the lower end of the bottom pan will be tossed upwardly and forwardly relative to the bottom material supporting surface thereof and when the material reaches the upper end thereof it will be tossed therefrom onto the lower end portion of the next following pan 3. This continues until the material has been conveyed to the upper end of the top pan 3 wherefrom the material is discharged into a discharge chute 5. The material in thus being tossed and discharged from one pan 3 to the next pan will be turned over and thus effectively cooled, and since the material is exposed to the air it will remain in a fluffed-up condition. Furthermore, the access of the cooling air to all of the surfaces of the particles of the material as the latter is turned over will result in efficient cooling.

The conveyor is supported and guided for vibration along the path 4 as by means of a series of circularly arranged coil springs 6 disposed obliquely between the base 1 of the conveyor and the base proper 7 of the conveyor assembly, the axes of the springs being generally parallel to such desired path of vibration. There are also provided a series of pivotally mounted rods 8 which have their upper ends pivotally connected to the conveyor base 1 and their lower ends pivotally secured to the base proper 7 whereby the arcuate paths of the upper ends of said rods 8 are substantially parallel with the desired path of vibration. Thus, said springs 6 and said rods 8 jointly support the conveyor. In order to make possible the vibration of the conveyor along the inclined arcuate path 4, the pivotal connections of the rods 8 to the conveyor base 1 and to the base proper 7 will be made through rubber bushings or the like (not shown).

Driving of the conveyor is effected as by means of an eccentric 9 which through connecting rod 10 and link 11 including bracket 12 fixed on base 1 and extensible link 14 imparts a predetermined amplitude of vibration to the conveyor at the natural frequency of said springs 6. By reason of the provision of the rods 8 the generally vertical energy impulses transmitted to the conveyor will result in the vibration of the conveyor along the inclined arcuate path 4 as shown. As is evident, when the link 14 is a hydraulic shock absorber as shown, the conveyor can gradually settle on its spring mounting according to its own weight and the load of the conveyed material without affecting the predetermined amplitude of the vibration, since at operating frequency (for example 500 cycles per minute) the shock absorber can not alternately lengthen and shorten and thus said shock absorber constitutes in effect a rigid link which is automatically adjusted in length according to the weight of the conveyor and the load thereon.

Other modes of applying the principle of the invention may be employed, change being made as regards the details described, provided the features stated in any of the following claims, or the equivalent of such, be employed.

I therefore particularly point out and distinctly claim as my invention:

1. A vibratory helical conveyor comprising a vertical support, a series of circumferentially overlapping and vertically offset ascending helical troughs having a prescribed helix angle secured to said support with the upper end of each ascending trough spaced above the lower end of the next succeeding ascending trough, and drive means for vibrating said support and the troughs secured thereto along an upwardly inclined path which is effective progressively to toss material on said ascending troughs upwardly therearound whereby material loaded on the bottom trough is conveyed upwardly around the successive ascending troughs for discharge from the top trough and is periodically cascaded and turned over as it falls from the upper ends of the respective ascending troughs to the lower ends of the successive ascending troughs, thus providing a substantial increase in the total length of the helical material supporting surface without increasing either the diameter or height of the conveyor.

2. A vibratory helical conveyor comprising a vertical support, a series of vertically offset ascending helical troughs having a prescribed helix angle secured to said support with the lower end portion of each ascending trough spaced directly below the upper end portion of the next preceding ascending trough in flow receiving relationship thereby increasing the effective length of the conveyor, and drive means for vibrating said support and the troughs secured thereto along an upwardly inclined path effective progressively to toss material on said ascending troughs upwardly therearound whereby material loaded at the bottom of the conveyor is conveyed upwardly around the successive ascending troughs for discharge at the top and is periodically cascaded and turned over as it falls from the upper ends of the respective ascending troughs to the lower ends of the successive ascending troughs, thus providing a substantial increase in the total length of the helical material supporting surface without increasing either the diameter or height of the conveyor.

References Cited in the file of this patent

UNITED STATES PATENTS

| 1,611,098 | Borner | Dec. 14, 1926 |
| 2,535,050 | Devol | Dec. 26, 1950 |

FOREIGN PATENTS

| 943,865 | France | Oct. 11, 1948 |